J. STIRISS.
ENVELOPE CLASP PUNCHING AND AFFIXING MACHINE.
APPLICATION FILED JAN. 15, 1921.

1,435,509.

Patented Nov. 14, 1922.
6 SHEETS—SHEET 6.

Inventor
Jacob Stiriss,
By James F. Duhamel,
Attorney

Patented Nov. 14, 1922.

1,435,509

UNITED STATES PATENT OFFICE.

JACOB STIRISS, OF CHICAGO, ILLINOIS.

ENVELOPE-CLASP PUNCHING AND AFFIXING MACHINE.

Application filed January 15, 1921. Serial No. 437,530.

*To all whom it may concern:*

Be it known that I, JACOB STIRISS, a citizen of the United States, residing at Chicago, Cook County, Illinois, have invented certain new and useful Improvements in Envelope-Clasp Punching and Affixing Machines, of which the following is a specification.

This invention relates to cutting and punching machines and more especially to machines for affixing metal clasps to envelopes where certain detail parts are operated to feed the envelope, to clinch and flatten the clasp to the same, to cut the clasp from a strip of sheet metal and secure it to the envelope, to attach a reinforcing strip to the flap of said envelope and to punch appropriate perforations in the flap and strip; the object of the invention being to make and attach a clasp to the envelope in one operation and complete the latter by providing it with closure means.

These and other objects and details of the invention are more fully described in the following specification, set forth in the appended claims and illustrated in the accompanying drawings, wherein:

Figure 1:
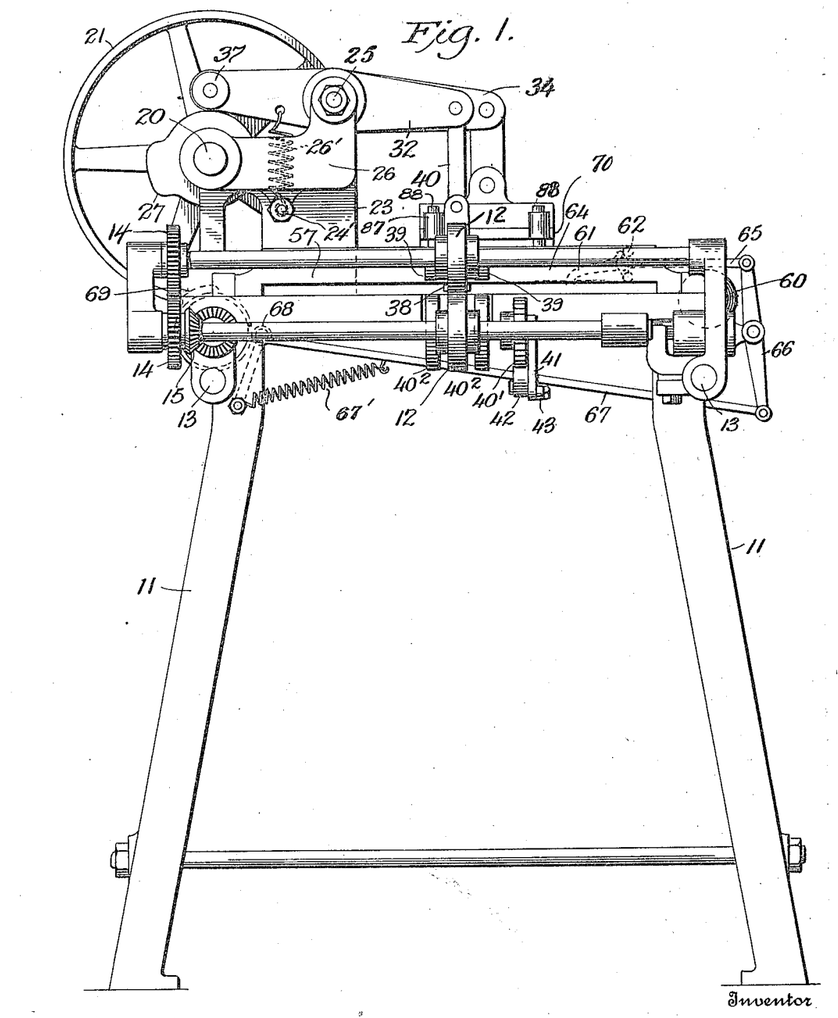
Figure 1 is a front elevation of the machine.

The machine comprises a base 10 supported on legs 11 and having at its front side and at sufficient distance from the base 10 to permit of the introduction of an envelope, the retracting rollers 12. A single pair of these rollers is shown in Fig. 1, while in Fig. 3 two pairs of rollers are shown so as to insure the withdrawal of the envelope on a straight line. The shafts for these rollers are journalled in brackets 13 and the rollers are rotated in unison by the gear wheels 14 that are actuated by the bevelled gears 15, one of the latter being located at the front end of a shaft 16, whose rear end carries a bevelled gear wheel 17 which, as will be seen in Fig. 2 is driven through gear wheels 18 and 19 on a vertical shaft and, by the main driving shaft 20, the latter being provided with driving pulley 21, and to which it is coupled by the clutch 22.

The shaft 20 is journalled in an upright 23 having an overhanging arm 24 which also carries a spindle 25 that is stationary, and at the front of the machine the shaft and spindle support a bracket 26 in which the shaft 20 is also journalled. On the latter is secured a series of cams 27, 28, 29, 30 and 31, while on the spindle 25 is journalled a series of rocking arms 32, 33, 34, 35 and 36, each carrying a roller 37 to ride on a correspondingly located cam.

The rollers 37 are forced into contact with their cams by springs 26' that are attached to each rocking arm and carried by a bar 24' that is hung from the bracket 26 and secured in the upright 23.

Each of the rocking arms is adapted to aid in the production or locating of a clasp in an envelope, and when a flap of the latter, while open, is inserted beneath a tongue 38 and while the envelope contains the same, the envelope may move freely forward or backward. The tongue 38 is secured above the base 10 near the rear of the machine, but it is free and unobstructed up to the front of the machine so the envelope may be inserted by an attendant flap down.

The various operations of cutting and affixing the clasp are then performed as will be later explained, and the rocking arm 32 being operated by cam 27 and rollers 39 carried at the lower end of the plunger 40, descend, straddling the tongue 38 and forcing the envelope into contact with rotating rollers 40² that retract the envelope to the influence of rollers 12, which discharge it at the front of the machine.

The operation of the rollers 40² is not continuous but long enough only to permit the operation of the other rocking levers and their plungers. An arm 41 carrying a pawl 42 is journalled on the shaft of the rollers 40² and the pawl actuates the ratchet wheel 40' that is attached to the said shaft, the pawl being held in contact with the ratchet wheel by any suitable spring. A rod 43 extends from the arm 41 rearward and is secured to a rocking arm 44 carrying in its upper formed end a roller 45 that is moved in and out with the rocking arm 44 by a cam 46. The latter is secured on a shaft 47 journalled in brackets at the rear of the base 10 and rotated by bevelled gear wheels 48, one of which is at the inner end of shaft 16 and driven as above described and shown in Figs. 2 and 3. A spring 44' connects the lower end of the lever 44 with the frame of the machine and forces the roller 45 against the cam 46, and thus ensures the action of the pawl on its ratchet.

Figures 17, 18, 19, 20, 21:
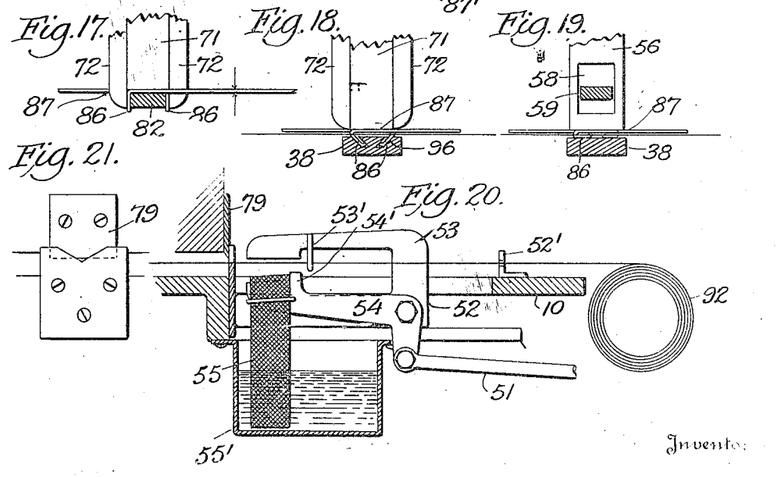
Fig. 17 shows the bending of the attaching prongs.
Fig. 18 shows the first step in attaching the clasp.
Fig. 19 shows the final attaching of the clasp to the envelope.
Fig. 20 is a side view of the gummed strip feed.
Fig. 21 is a face view of the gummed strip knife.

The shaft 47 also has secured to it a cam 49 that, as it rotates, rocks an arm 50 with a roller on the spindle adjacent arm 44, and reciprocates a rod 51 and slide 52, as more clearly shown in detail in Fig. 20, the slide operating in a slot in the base 10 and feeds a strip of gummed paper from a roll 92 at the rear of the machine. The slide carries a rigid overhanging jaw 53 under which the tape passes, and the tape is moved through a guide 52' and a stripper 53'.

Pivoted to the slide 52 is a bell crank lever 54, one arm of which is secured to the inner end of the rod 51, while the other arm is adapted to impinge the jaw 53 at its outer end, where the bell crank arm carries a wick 55 that hangs into the water of a tank 55' and is adapted to moisten the gum on the under side of the strip with each forward movement of the slide and thrust of the rod 51.

A spring 50' is attached to the lower end of arm 50, so that its roller is forced against the cam to cause the reciprocation of the rod 51.

The second rocking arm 33 carries at the end a plunger 56 that plays through the cross-bar 57 as clearly shown in Figs. 4, 10, 11 and 19, and the said plunger is slotted at 58 for the passage of a member 82 and the lower end of the plunger operates with an anvil 59 on the upper face of the tongue 38 to clinch and flatten the fastening prongs of the clasp.

Figure 3:
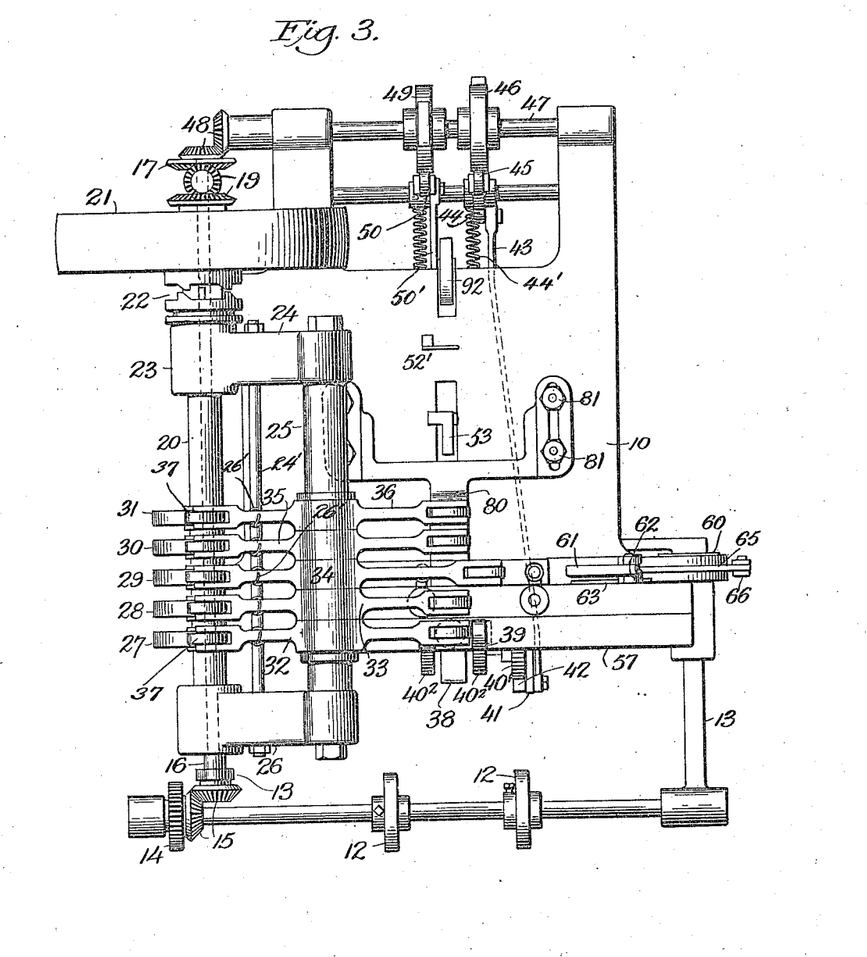
Fig. 3 is a plan view.

At the right hand side of the machine, as shown in Figs. 1 and 3, is a spool 60 of sheet metal strap from which the clasps are made, and above the free end of the strap is a presser foot 61 pivoted to the slide 63 that plays in a slot 64 in the cross bar 57, the presser foot being raised by the rearward movement of the rod 65 until the pin 62 is engaged, when the slide is withdrawn by the said rod 65.

The forward movement of the rod 65 causes the presser foot to be thrown down and the slide to move forward, the rod being actuated by the rocking lever 66 and the reciprocating rod 67 carrying a roller 68 at its end that is operated by the cam 69 on the shaft 16 at the other side of the machine, and as shown in Fig. 1. A spring 67' attached to the frame and the rod 67 draws the latter towards said cam and keeps the roller 68 in constant contact.

When, the forward movement takes place, in consequence of the rotation of the cam 69, the presser foot descends upon the metal strip, and when firmly engaged the rod 65 forces the slide forward and the greater the resistance of the strip and spool 60, the firmer the grip of the presser foot, and the metal strip is fed forward and released when the rod 65 re-acts.

When the above movement is completed, the rocking lever 34 is actuated by its cam 29 and the plunger 70 at its outer end is forced downward carrying with it the elongated punch 71 that is best shown in Figs. 5, 6, 10 and 11. This punch is adapted to cut the metal strip into sections without the loss or waste of any of the metal and by means of the jaws 72 to bend prongs at each side of the clasp that are driven through the side of the envelope, to which the clasp is attached, and clinched.

To provide holes through which the ends of the clasp are passed to bind the flap, the rocking arm 35 is provided with a plunger 73 having two punches 74 at its end and which pass through a block 75 adapted to press down the flap when the perforations are punched. The plunger is surrounded by a spring 76' that forces the block down and holds the flap and the punches follow to function when the rocking arm is actuated by the cam 30.

The fifth and last rocking lever 36, operated by the cam 31, has a plunger 76 at its outer end that carries the yielding block 77, one end of which carries the knife 79, and as the moistened strip of paper is fed from the roll 92, as above explained, and under the knife 79, it is guided up over the envelope flap, so that when the block 77, descends it not only affixes the gummed strip between the perforations, but detaches the section from the main roll of gummed paper. While this operation is taking place, the slide 52 and jaw 54 are being retracted to again grasp and feed the strip of paper forward.

Figure 4:
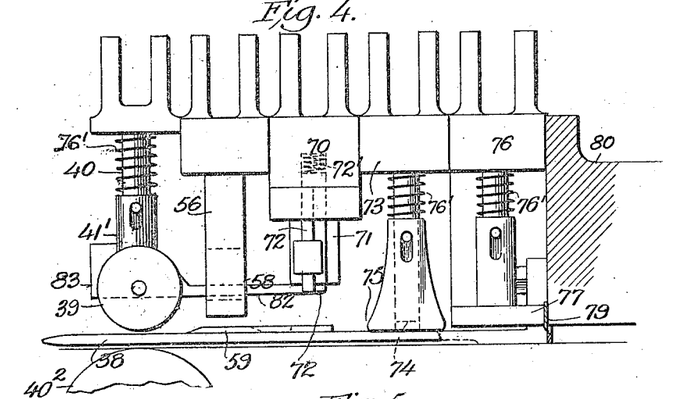
Fig. 4 is a vertical sectional view through the various plungers operating the details connected with the affixing of the clasp.

As will be seen in Fig. 4, all of the operating parts 39, 75 and 77 are resiliently connected with the rocking arm so that rigidity is eliminated, yet the parts are sufficiently stiff to perform their functions. This resiliency is effected by slotted blocks at the ends of the plungers, pins passing through the slots into the stems, and springs 76' surrounding the stems below the forks to press the blocks downward.

It will be seen that the rocking arm 34 is longer than the rest and this is because of the length of the punch 71 and one of its parts being at the centre line of the other plungers, while the other part is set backward for the initial cutting.

Figure 2:
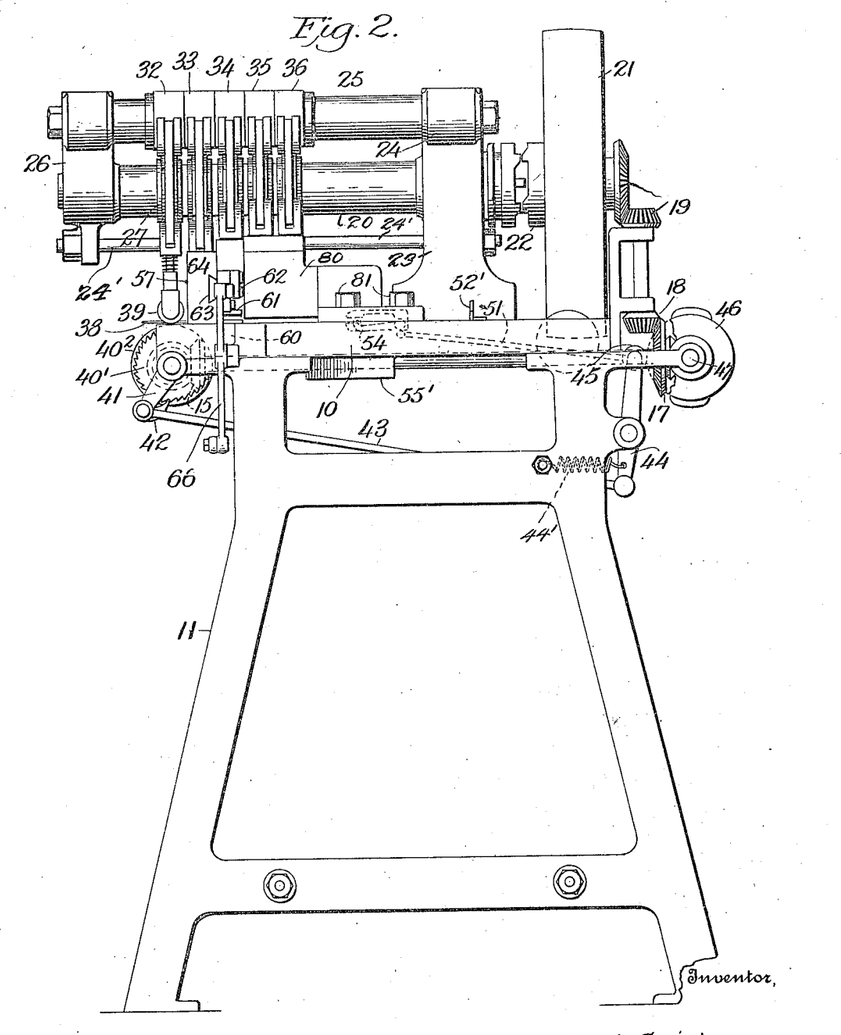
Fig. 2 is a side elevation of the same.

The plungers are otherwise adjacent each other and guided by the overhanging bracket 80 that is adjustable along the base by means of the bolts 81 and, as will be seen in Figs. 2 and 4, which is elevated sufficiently to allow the envelope to play beneath the plungers. The cross-bar 57 also acts as a guide for certain plungers, as will be seen in Fig. 13, where the die 70 is shown as being carried by the same.

Figures 13, 14, 15, 16:
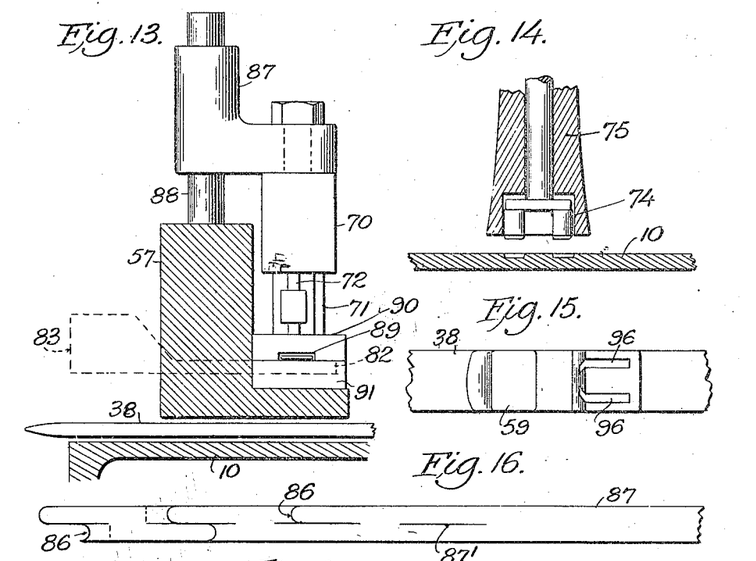
Fig. 13 is an end view of the punching and cutting plunger.
Fig. 14 is a cross-sectional view of the perforating punches.
Fig. 15 shows the means for attaining the first step.
Fig. 16 is a view of a metal strip showing the clasps being cut therefrom.

While an envelope is fed in and over the rollers 12, on the completion of the above described operations, the end of the envelope to which the fastener is attached is retracted by the rollers 39 until its rear end is caught between these rollers 12 and is drawn out by them when the new envelope can be fed in. A single pair of these rollers, as in Fig. 1, may be used for small envelopes, while larger envelopes may be operated on by two or more adjustable rollers 12, as shown in Fig. 13.

As will be seen in Figs. 4, 9, 10, 11 and 12, the rollers 39 are carried by a sleeve 40' resiliently suspended from the plunger 40, and the lower end of this plunger is forked as at $41^2$ to straddle an anvil 82 having a head 83 with an inclined slot 84 through which passes a pin 85 from the fork and as the plunger descends the anvil is drawn outward. Normally the inner end of the anvil is under the punch 71 to support the strip of sheet metal, and the jaws 72 descend upon each side of it as shown in Fig. 17, and bend and force down the attaching prongs 86 of the clasp 87, as shown in Fig. 17.

In the latter view is shown how the clasps are cut from the strip of metal and where the extremities of the closure fingers leave the points of the attaching prongs that are driven through the back of the envelope and clinched.

Figure 12:
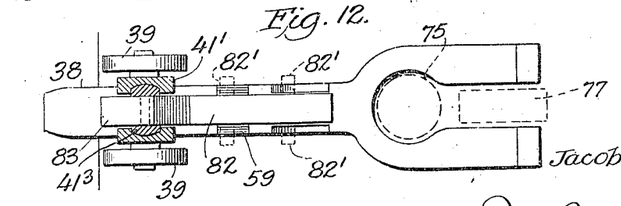
Fig. 12 is a plan view of the tongue and arbor.

The anvil 82 is supported at its side edges in the die 91, or may have ears 82', shown by dotted lines in Fig. 12, to support the same at convenient points.

The block 70 that carries the cutting die has brackets 87 secured to its upper face as shown in Figs. 1 and 13, and these brackets have openings in their vertical arms to receive upright guide pins 88 from the crossbar 57 that permit the vertical movement of the die when the lever 34 is operated.

Figures 6, 7, 8, 9:
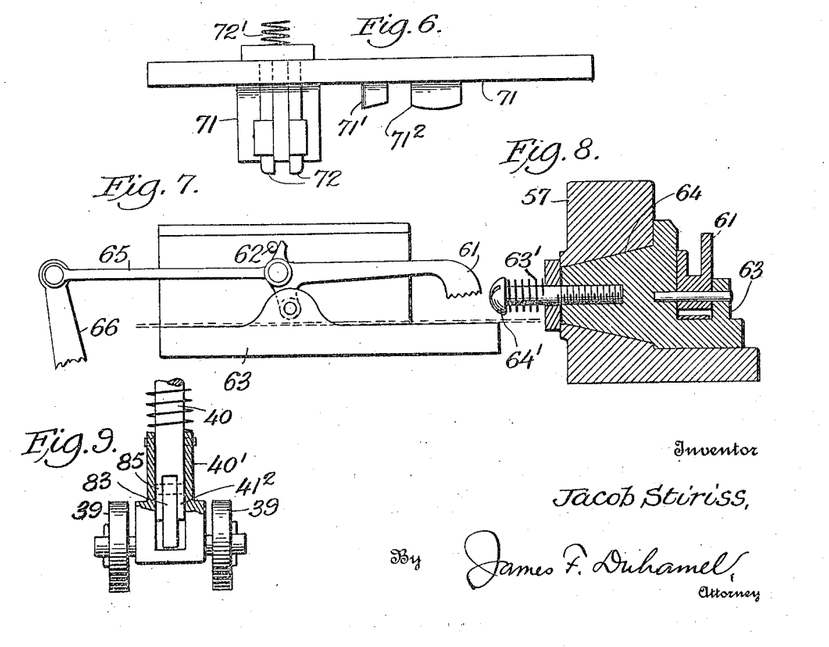
Fig. 6 is a side view of the same.
Fig. 7 shows the metal strip feed in detail.
Fig. 8 is a sectional view through the metal strip feed.
Fig. 9 is an enlarged front view of the lower end of the retractile roller plunger.

The metal strip feed is shown in the cross-sectional view, Fig. 8, and it will be seen that the slide 63 has an extension that passes through a slot 64 in the cross bar 57 and is under the tension of a spring 63' carried by and adjusted by a stud 64' to cause the parts to fit together and the metal strip is seen beneath the presser foot 61.

The metal strip 87 is shown in Fig. 16 in the process of being cut into blank clasps and where it will be seen that interior slits 87' are first cut by the punch $71^2$, Fig. 6. The prongs 86 at one side are cut by the punch 71', while the prongs on the other side are cut by the punch 71 during the affixing operation shown at Fig. 11.

Figure 10:
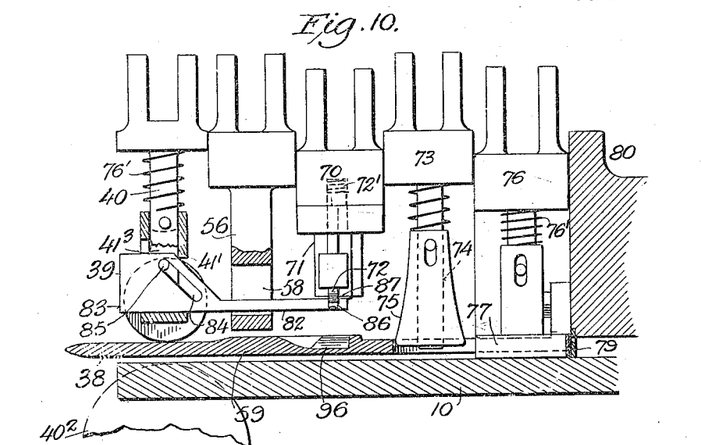
Fig. 10 is a sectional view through the plungers showing several of the same in operative positions.
Figure 11:
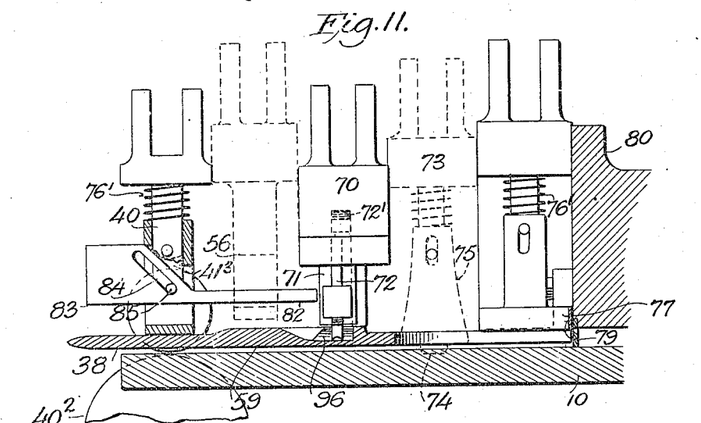
Fig. 11 is a similar view with other plungers in operative position.

In Figs. 10 and 17, the jaws 72 are shown in the act of bending the prongs 86 over the anvil 82, the plunger 70 having made its initial movement and the jaws being actuated by the enclosed spring 72' to allow a certain amount of lost motion while the plunger carrying the die descends further, as shown in Figs. 11 and 18. To permit the additional movement, the anvil 82 is withdrawn by the plunger 40 and the clasp is carried down in the jaws 72 to a slotted block on tongue 59. The jaws having retreated, the prongs are forced down into inclined slots 96, as shown in Fig. 18, where they are forced through the paper of the envelope and turned inward, the paper being illustrated with a single line, in both Figs. 18 and 19.

The slots 96 are arranged longitudinally in the block of the tongue and have open ends, as shown in Fig. 15, through which the prongs are released, and as the plunger 70 rises, plunger 40 descends and wheels 39 and $40^2$ seize the envelope and retract it.

The descent of plunger 40, therefore, first withdraws the anvil 82 from the path of the die and the latter immediately performs its work and withdraws before the complete movement of plunger 40 to remove the envelope. The envelope is moved only far enough to remove the clasp from the slotted block and on to the clinching block 59 and directly beneath the plunger 56 which descends, as shown in Fig. 19, and flattens the prongs 86 and clinches them to the back of the envelope.

The plunger 40 now descends again long enough to cause the wheels 39 and 40² to catch the completed envelope and deliver it to the rollers 12 which rotate continually. Assuming that the envelope is properly located by hand on the tongue 59 the sequence of operations is as follows.

The plunger 70 first descends and the punch cuts the slits 87' in the strip of metal, the clasp being partly severed in the previous movements by the punches 71' on the die.

Then the prongs 86 are formed as shown in Fig. 17 and the completed clasp is severed by the punch 71.

Plungers 40 and 76 next descend, the former withdrawing anvil 82 and causing the rollers to engage the envelope to retract same when released, while the latter descends on the flap at the inner end of the tongue 38 and cuts and attaches the reinforcing patch thereto.

About the same time plunger 70 continues its downward movement and the jaws and the punch perform the operation shown in Fig. 18.

The plunger 40 is then brought into action and the envelope is retracted far enough to bring the attached clasp beneath plunger 56 which now descends and clinches the prongs and firmly secures the clasp to the envelope. At the same time the plunger 73 descends and the punch 74 perforates the flap and the reinforcing patch.

Plunger 56 and 73 immediately ascend and the attaching operation is now completed.

Plunger 40 again descends and the envelope is again caught by the rollers 39 and 40² and carried to rollers 12 and delivered for use.

When the plungers are all up and the completed envelope removed the machine is ready to receive another envelope to have the operation repeated. The new envelope is now inserted in the machine far enough for the plungers 70 and 76 to perform their initial work.

Plunger 70 is moved downward twice, the first time to cut the clasp from the metal strip and bend its prongs and a further movement to attach same to the back side of the envelope.

Plunger 40, as above described, moves up and down several times to enable the rollers 39 and 40² to retract the envelope while plungers 73 and 76 move down but once, and the operations of these various plungers is shown in Figs. 4, 10 and 11.

Figure 5:
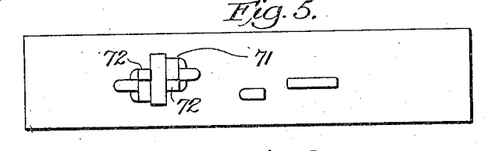
Fig. 5 is a bottom plan view of the clasp punch.

While the machine as above described is adapted to make and attach an envelope clasp such as shown at the left hand end of the strip shown in Fig. 16, it is obvious that with the substitution of other punches for those shown in Figs. 5 and 6, other clasps may be made and attached with the mechanism above described and shown in the drawings.

It is also evident that the details of the machine may be otherwise altered and modified without departing from the essential features above described.

What I claim as new is:

1. In an envelope-clasp punch and affixer, the combination of a source of power, a punch adapted to form and cut a clasp, a clinching plunger, a reinforcement affixer, perforating punchers, and retracting rollers operated by the source of power and adapted to move the envelope.

2. In an envelope-clasp punch and affixer, the combination of a cutting and forming punch, a clinching punch, means for cutting and affixing a reinforcing strip to an envelope, means for perforating the strip and envelope, retracting rollers, and means for intermittently operating the punches, retracting rollers, cutter and perforator.

3. In an envelope-clasp punch and affixer, the combination of a source of power, a punch and die, a perforating punch, a pressing and cutting member, a clinching member, retracting rollers operated by the source of power, means for intermittently operating the punches and perforating and pressing and cutting members and the rollers; and a tongue with a clinching anvil to carry an envelope and be operated on by the punch and die and the clinching member.

4. In an envelope-clasp punch and affixer, the combination of a source of power, a tongue to guide the envelope, a die punch adapted to cut a clasp and connect it with the envelope, a clinching plunger operating on the clasp to affix it to the envelope, and rollers adapted to remove the envelope when the affixing is completed.

5. In an envelope-clasp punch and affixer, the combination of a shaft carrying a series of cams, a rocking arm, a plunger operated by a cam and at the end of a rocking arm, a cutting and affixing punch for the clasp and at the end of the plunger, a second plunger to clinch the clasp to an envelope and operated by a cam, and feeding means for a metal strip to be cut into clasps.

6. In an envelope-clasp punch and affixer, the combination of a shaft carrying a series of cams, rocking arms actuated by the cams, a tongue adapted to carry and guide an envelope, a cutting and affixing punch above the tongue and operated by a rocking arm, a clinching plunger, feeding means for a strip of metal, and retracting rollers for the envelope and made operable by a second rocking arm.

7. In an envelope-clasp punch and affixer, the combination of a clasp cutter and affixer, a reinforcing patch affixer, feeding means for a strip of metal, feeding means for a strip of gummed paper, a clinching plunger and a perforating plunger.

8. In an envelope-clasp punch and affixer, the combination of a series of cams on a power shaft, a series of corresponding rocking shafts, a tongue adapted to carry an envelope and having a clinching anvil, a clasp cutting forming and connecting die operated by one of the rocking arms, a reinforcing strip affixer operated by another rocking arm, feeding means for a strip of sheet metal, feeding means for a strip of gummed paper, and plungers operated by rocking arms to clinch the clasp and perforate the flap of the envelope.

9. In an envelope-clasp machine, the combination of a tongue having a clinching anvil and adapted to carry and guide an envelope, an anvil above the same, a clasp cutting punch adapted to act on the anvil to form affixing prongs on the clasp and connect the clasp to an envelope by aid of the forming block, means for withdrawing the anvil, and means for retracting the envelope.

10. In an envelope-clasp machine, the combination of a tongue supported above a table and having a clinching anvil, an arbor above the tongue, a plunger carrying rollers and adapted to withdraw the anvil, reciprocating cutting punch for the clasp and adapted to bend its prongs over the anvil, means for advancing the punch after the anvil is withdrawn to set the clasp in an envelope, intermittent feeding means for a metal strip, and intermittent retracting means for the envelope.

11. In an envelope-clasp machine, the combination of a base carrying an overhanging guide, a power shaft with a series of cams, rocking arms adapted to be actuated by the cams, plungers at the ends of the rocking arms and playing in the guide, a clinching anvil above the base and below the guide, a cutting punch operating on the forming block to set a clasp in an envelope, and a clinching member operating on the said block to secure the said clasp.

12. In an envelope-clasp machine, the combination of a base carrying a power shaft, cams on the shaft, a series of rocking arms actuated by the same, a plunger with a cutting punch actuated by one of the rocking arms, a tongue beneath the punch and having a clinching anvil with inclined slots therein, a second plunger with clinching face above the tongue, a third plunger having a knife and pressing block, a fourth plunger having a perforating punch, and a fifth plunger having resilient retracting rollers adapted to carry an envelope from the first and the third plungers to the second and fourth plunger and finally from the base.

13. In an envelope-clasp machine, the combination of a base, a power shaft thereon and having a series of cams, rocking arms with plungers adapted to be actuated by the cams, a punch and clinching tool rigidly carried by plungers, a knife with pressing block and a perforating punch resiliently carried by plungers, and retracting rollers at the lower end of a plunger resiliently connected therewith.

14. In an envelope-clasp machine, the combination of a base, a power shaft mounted on the same, a series of cams on the shaft, a guide bracket above the base, plungers playing through the guide bracket, vertically shifting feed rollers above the base, cooperating intermittently actuated rollers beneath the base, a shaft driven from the power shaft, a cam on the same, a rocking lever actuated by the cam, a pawl actuating the coperating rollers, a rod connecting the rocking lever with a pawl, a second cam on the latter shaft, and feed means for a strip of gummed paper operated by the second cam.

15. In an envelope-clasp machine, the combination of a frame having a base, a power shaft supported on the base, a series of cams on the same, rocking arms actuated by the cams, plungers operated in sequence by the rocking arms, retracting rollers at the front of the machine, gearing at the side of the machine to operate the rollers and driven by the power shaft, means for feeding a strip of metal under one of the plungers, and means for feeding a strip of gummed paper under another of the plungers.

16. In an envelope-clasp machine, the combination of a frame having a base, a power shaft supported above the base, a series of plungers operated by the power shaft to move separately and at various times, a tongue to guide an envelpoe beneath the plungers, reciprocating jaws adapted to feed a strip of gummed paper beneath one of the plungers, a presser foot adapted to feed a strip of sheet metal beneath another plunger, a cutting and forming punch on the latter plunger, means for reciprocating the jaws and the pressure foot and driven by the power shaft, and retracting rollers intermittently driven by the power shaft.

In testimony whereof, I have signed my name to this specification in the presence of two subscribing witnesses, this January 12, 1921.

JACOB STIRISS.